US006518337B1

(12) United States Patent
Baker et al.

(10) Patent No.: US 6,518,337 B1
(45) Date of Patent: Feb. 11, 2003

(54) SURFACE ADHESION MODIFYING COMPOSITIONS

(75) Inventors: Keith Homer Baker, Cincinnati, OH (US); William Michael Scheper, Lawrenceburg, IN (US); Chandrika Kasturi, Cincinnati, OH (US); Peter Yau-Tak Lin, Middletown, OH (US); Magda El-Nokaly, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/831,787

(22) PCT Filed: Nov. 16, 1999

(86) PCT No.: PCT/US99/26967

§ 371 (c)(1), (2), (4) Date: May 14, 2001

(87) PCT Pub. No.: WO00/29538

PCT Pub. Date: May 25, 2000

Related U.S. Application Data

(60) Provisional application No. 60/108,599, filed on Nov. 16, 1998.

(51) Int. Cl.[7] ............................ C08K 5/52; B32B 23/04

(52) U.S. Cl. .......................... 524/145; 524/35; 428/532

(58) Field of Search .................... 524/35, 145; 428/532

(56) References Cited

U.S. PATENT DOCUMENTS 4,948,531 A * 8/1990 Fuggini et al. ............. 252/544

FOREIGN PATENT DOCUMENTS

| | | |
|---|---|---|
| DE | 27 28 464 | 1/1978 |
| DE | 19 19 886 | 11/1979 |
| EP | 374 471 A1 | 6/1990 |
| GB | 1 415 277 | 11/1975 |
| WO | 98/24871 | 6/1998 |

* cited by examiner

*Primary Examiner*—Kriellion A. Sanders
(74) *Attorney, Agent, or Firm*—Kevin L. Waugh

(57) ABSTRACT

The present invention relates to compositions which modify the surface adhesion properties of a surface such as, tableware, cutting board, sinks and food preparation areas, generally

12 Claims, No Drawings

SURFACE ADHESION MODIFYING COMPOSITIONS

This application claims the benefit of Provisional Application No. 60/108,599, filed Nov. 16, 1999.

FIELD OF THE INVENTION

The present invention generally relates to compositions, for a making surface adhesion modifying compositions which aids in the removal of food soils form those surfaces. The present invention also relates to cleaning compositions which also modify the surface adhesion of food soils to a hard surface.

BACKGROUND OF THE INVENTION

It has always been well understood that regardless to what degree a surface has been rendered "cleaned" the mere appearance of residues due to the cleaning system will bring into question the efficiency of the cleaning product. Consequently, when a visible film, a residue or streaking is left behind, the success of the cleaning process becomes dubious. Therefore not only must a cleaning composition wash the surface in question but it must also leave the surface with the appearance of being cleaned.

Most soils, especially, food soils, such as cake dough, meat juices, etc., are deposited on to a surface "wet". That is, these soils contain some water, which after time evaporates leaving a hardened soil. It is much easier to remove these soils while "wet" than when the water has evaporated "hardening" the soil. In this scenario, the consumer is faced with two choices, either clean up the spill immediately and take advantage of the moisture in the soil or wait till the soil has hardened. The former, while it is ideal, is impractical for today's busy consumer, with the multitude of demands on consumers time, stopping to clean up every spill, even minor ones as they happen, is time consuming and impractical. Conversely, while waiting till the end of food preparation or the end of the meal, may save time by doing all the cleaning at once. The food soil has by now hardened, making the cleaning task much more difficult and time consuming. In this case the consumer is left with the situation of either doing a poor job and leaving the stubborn satins or resorting to harsh and/or abrasive cleaners, which is far from desirable, especially on fine china or delicate work surfaces such as marble. This limits the consumer to either cleaning up every little spill as it happens or resort to harsh and/o abrasive chemicals to remove tough soils after they have dried.

Non-stick cookware do not have this problem. But, coating every possible food contact surface that could, such as cutting boards, kitchen counter tops, plates, silverware, high chair trays etc., would be expensive and impracticable. Applying a coating of "non-stick" baking spray would certainly be a cheap and readily available alternative to Teflon coating all food contact surfaces. The problem is that these compositions are when applied to a surface are greasy to the touch and leave a very distinctive and visibly unappealing layer. The appearance is that all the surfaces have been smeared with a stick of butter or margarine. While these so treated surfaces are easy to remove tough food soils from they have the distinct appearance of being uncleaned. Consequently, these compositions while solving one problem, create new ones which, would result in the entire surface having the appearance of being unclean.

The problem remains that there is no convenient way to easily remove hard tough food soils.

SUMMARY OF THE INVENTION

It has now been surprisingly found that a surface adhesion modifying composition has been discovered, without the greasy or oily feel negatives of "non-stick" baking sprays. These novel compositions have been found to not have the negative surface appearance of "non-stick" baking sprays. Furthermore, these compositions entirely comprise food safe materials, or materials which are Generally Recognized As Safe, or G.R.A.S. materials. This means that these compositions are both safe and suitable for direct application to food work surfaces, such as cutting boards, sinks, and kitchen counter tops, as well as direct food contact surfaces, such as, plates, and silverware.

The compositions of the present invention are surface adhesion modifying compositions, which comprise a toxicologically-acceptable film forming polymer and a toxicologically-acceptable release aid, wherein said film forming polymer and said release aid are present in a weight ratio of from about 1:20 to about 20:1, and said composition is without an oily or greasy feel or touch when applied to a surface.

In a second aspect the compositions of the present invention are composition for providing non-stick properties to food-contacting surfaces comprising a toxicologically-acceptable film forming polymer and a toxicologically-acceptable release aid, wherein said film forming polymer and said release aid are present in a weight ratio of from about 1:20 to about 20:1, and said composition has a non-greasy feel when applied to a surface.

In a third aspect, the present invention is also directed to methods for rendering a food-contact surface non-stickable comprising depositing a composition comprising a toxicologically-acceptable film forming polymer and a toxicologically-acceptable release aid, wherein said film forming polymer and said release aid are present in a weight ratio of from about 1:20 to about 20:1, and said composition has a non-greasy feel when applied to a surface.

These surface adhesion modifying compositions can comprise additional ingredients, such that they can clean the surface to which they are applied as well as leaving a coating or layer which aids in subsequent cleaning of the surface. These compositions can aid cleaning via any conventional means, including wiping with a wet cloth, rinsing with water, cleaning with a hard surface cleaner, cleaning the surface in an automatic dishwasher or via hand in a sink or basin with a hand dishwashing composition.

All parts, percentages and ratios used herein are expressed as percent weight unless otherwise specified. All documents cited are, in relevant part, incorporated herein by reference.

DETAILED DESCRIPTION OF THE INVENTION

As it was stated previously the compositions of the present invention are surface adhesion modifying compositions, which comprise a toxicologically-acceptable film forming polymer and a toxicologically-acceptable release aid, wherein said film forming polymer and said release aid are present in a weight ratio of from about 1:20 to about 20:1, preferably about 1:10 to about 10:1, and said composition is without an oily or greasy feel or touch when applied to a surface.

The film forming polymer may be any film forming polymer which is a food acceptable material. Preferred film forming polymer:; include ethylcellulose, hydroxypropylcellulose, methylhydroxypropylcellulose, methyl ethyl cellulose, PVP, copolymer condensates of ethylene oxide and propylene oxide, and polyethylene glycol. Other suitable film forming polymers are Gums, such as Agar, Guar gum, Gum arabic, Gum arabic uses, Gum ghatti, Gum karaya, Hydroxypropyl guar gum, and Xanthan gum; Alginates, such as, Calcium alginate, Calcium-sodium alginate; Protein Film forming polymers, such as Pectin albumen, poly amino acids (e.g., poly lysine), gelatin; and Waxes, such as Carnuba wax. Exemplary of the film-forming agents of the invention are the following, non-toxic, food grade, commercially available, film-forming agents: Natrosol.RTM. (nonionic water-soluble hydroxyethylcellulose from Aqualon, Wilmington, Del.); Methocel.RTM. (methyl hydroxypropylcellulose made from cellulose and propylene oxide and available from Dow Chemical); Bermocoll E.RTM. (non-ionic, water soluble ethyl hydroxyethylcellulose from Akzo Nobel. The preferred film forming agents are Methocel.RTM. E50 LV, Methocel.RTM. K100, Methocel.RTM. F50, Natrosol.RTM. 250KR, Bermnocoll E:.RTM.351 FQ, Bernocoll E.RTM.411 FQ, and Bernocoll E.RTM.320 FQ.

It is preferred that the film forming polymer present in the composition in the amount of from about 0.1% to about 50%, more preferably from about 0.5% to about 25%, even more preferably from about 1% to about 15% by weight of the composition.

Release agents are widely used in both the manufacturing areas and in the production and processing of foods. The general technical area of release agents for both manufacturing and food applications is summarized in The Kirk Othmer Encyclopedia of Chemical Technology, fourth edition volume 21 pages 207 to 218 and is incorporated herein by reference. It is preferred that the release agent present in the composition in the amount of from about 0.1% to about 50%, more preferably from about 0.5% to about 25% , even more preferably from about 1% to about 15% by weight of the composition.

The release aid is preferably a phospholipid. The most preferred release agent is lecithin. The term lecithin can be used to describe both the pure phosphatidyl choline and mixtures of the phosphatidyl choline with other phospholipids, triglycerides, etc. The general technical area of lecithin for both manufacturing and food applications is summarized in The Kirk Othmer Encyclopedia of Chemical Technology, fourth edition volume 15 pages 192 to 210 and is incorporated by reference. However, aqueous dispersions of lecithin preferably have a buffer to maintain a near neutral pH. This reduces the extent or likelihood of hydrolysis of the lecithins which could result in a loss of efficacy. Compositions with lecithin that are exposed to air preferably contain an antioxidant to reduce the potential degradation of the lecithin. Aqueous dispersions of lecithin will require the presence of an antimicrobial preservative.

Other preferred release compounds from include but ale not limited to Glyceryl tristearate, Oxystearin, Castor oil, salts of an oxyacid of phosphorous, White mineral oil, Petrolatum, Hydrogenated sperm oil, Mineral oil, Mannitol, Calcium stearate, Magnesium carbonate, Magnesium oxide, Magnesium stearate, Mono- and diglycerides, Monosodium phosphate derivatives of mono- and diglycerides, Sorbitol, and Camauba wax.

These compositions may further comprise a toxicoloeically-acceptablc adjunct. These, when present are preferably selected from the group consisting of selected from the group consisting of preservatives, surfactants emulsifiers, surface finish agents, anti-microbial agents, anti-oxidants, solvents, propellants, carriers, perfume, diluents, carriers, or process aids, builders, and mixtures thereof. It is preferred that the toxicologically-acceptable adjunct when present in the composition be present in the amount of from about 0.1% to about 50%, more preferably from about 0.5% to about 25%, even more preferably from about 1% to about 15% by weight of the composition.

Surface finishing agents may be using either as release agents or compounds to lessen the negative effects of the release agent. Examples of such surface finishing agents include but are not limited to are Glyceryl tristearate, Mannitol, Ammonium hydroxide, Dextrin, Wheat gluten, Acacia gum arabic, Mono- and diglycerides, Sorbitol, Beeswax (yellow and white), Candelilla wax, Carnauba war, and Zein. It is preferred that the surface finishing agents when present in the composition be present in the amount of from about 0% to about 5%, more preferably from about 0.1% to about 3%, even more preferably from about 0.5% to about 2% by weight of the composition.

Diluents, carriers, or process aids are often useful in processing compositions or in the final product physical or performance attributes. These include but are not limited to, water, ethanol, glycerin, triglycerides. It is preferred that the diluents, carriers, or process aids when present in the composition be present in the amount of from about 1% to about 99.9%, more preferably from about 5% to about 99.9%, even more preferably from about 20% to about 99.9% by weight of the composition.

Propellants are often used in spray applicators and aerosol canisters. Appropriate propellants include but are not limited to: N2O, CO2, N2, Propane, Octafluorocyclobutane.

Diluents, carriers, or process aids are used to aid in the preparation, or delivery of the inventive composition. They can, like the solvents, also be selected to aid in the rapin forming of the non-stick surface.

Product stability is an important factor in the formulation of products in this application. The inclusion of antioxidants is important because the preferred release aid, lecithin, often contain substantial degrees on unsaturation. Appropriate preservative include the following antioxidants but are not limited to, Anoxomer, BHA., BHT, Ethoxyquin, 4-Hydroxymethyl-2,6-di-tert-butyl-phenol, TBHQ, and THBP.

Similarly important to product stability is resistance to microbial contamination and growth. While much microbial contamination can be avoided through careful manufacturing practices, it is important to include an antimicrobial preservative as occasional contamination may occur in the manufacturing process or periodic use of the product (e.g., occasional household use) may expose the composition to microbial contamination over its expected usage period. Appropriate antimicrobial preservatives include but are not limited to, Heptylparaben, Quaternary ammonium chloride combination, Benzoic acid, Lactic acid, Potassium acid tartrate, Propionic acid, Ethyl alcohol, Hydrogen peroxide, Methylparabcn, Nisin preparation, Propylparaben, Sodium benzoate, Sodium diacetate, and Sodium propionate. Other potentially useful preservatives are chelants such as Calcium disodium EDTA and Disodium EDTA.

The use of builders or other sequestrants is also contemplated. Suitable builders and sequestrants include but are not limited to: Citric acid or its salts, Sodium tripolyphosphatc, Sodium acid phosphate, Calcium diacetate, Calcium hexametaphosphate, Monobasic calcium phosphate, Dipotassium phosphate, Disodium phosphate, Sodium gluconate, Sodium hexametaphosphate, Sodium metaphosphate, Sodium phosphate, Sodium pyrophosphate, Tetra sodium pyrophosphate, and Sodium tripolyphosphate The use of surfactants and emulsifiers, and other purpose is also contemplated. Suitable surfactants, emulsifiers include but are not limited to, Dioctyl sodium sulfosuccinate , Glyceryl tristearate, Methyl glucoside-cocornut oil ester, Oxystearin, Sodium lauryl sulfate, Sodium mono- and dimethyl naphthalene sulfonates, Sodium stearyl fumarate, Acetylated monoglycerides, Succinylated monoglycerides, Monoglyceride citrate, Ethoxylated mono- and diglycerides, Polysorbate 60, Polysorbate 65, Polysorbate 80, Polydextrose, Sorbitan monostearate, Calcium stearoyl-2-lactylate, Sodium stearoyl-2-lactylate, Lactylic esters of fatty acids, Lactylated fatty acid esters of glycerol and propylene glycol, Glyceryl-lacto esters of fatty acids, Polyglycerol esters of fatty acids, Propylene glycol mono- and diesters of fats and fatty acids, Propylene glycol alginate, Sucrose fatty acid esters, Fatty acids, Oleic acid derived from tall oil fatty acids, Salts of fatty acids, and Synthetic fatty alcohols.

It may be necessary to add a thickening agent to the composition of the present invention in order to obtain the desired viscosity. Suitable thickening agents include modified starches, vegetable gums and other conventional thickening agents suitable for food use.

An essential part of the definition of active materials is that the materials used be toxicologically safe so they may be appropriately and safely used on food contact surfaces. Listing of appropriate ingredients for use in foods is given in the Code of the Federal Register (21) (CFR 21). In general most of the material described herein are ingredients described in CFR 21

The compositions of the present invention can be of any convenient form. However, it is preferred that the compositions are in the form of a liquid, gel, paste, aerosol and pumpable spray. The composition can be either sprayed on directly or applied via a cloth, or directly on to the surface via a contact surface, such as a sponge, which is attached to the container which holds the composition. The solution may be applied by use of any number of standard spraying devices. The spraying devices should produce a uniform spray pattern so as to evenly coat the target surface.

The solution may be applied by use of various dispensing devices. The dispensing devices will be comprised of two essential parts. The first essential part is a applicator implement that when contacted with the surface to be treated dispenses the active solution evenly and smoothly onto the target surface. The implement could be an approximately flat, rigid or semi rigid article covered by a foam or sponge-like covering that is porous with respect to the solution. The approximately flat nature of the applicator implement is useful in achieving uniform coverage of flat surface with minimal effort. The size of the applicator head would be approximately from 0.5 cm×1.0 cm to approximately 10 cm×20 cm. The exact dimensions would be dictated by the specific intended use of the applicator implement. In general if the implement is designed for areas of large relatively flat surface area, a larger sized applicator implement would be preferred. Conversely for less flat or smaller surfaces areas, a smaller or some what less flat applicator implement may be preferred. The second essential part of the device is a reservoir for the solution. The reservoir for the solution is connected to the applicator implement such that as the solution is dispensed form the head, the solution is replenished in the applicator implement Alternatively, the composition is adsorbed on to a flexible substrate, either woven material or non-woven fabric, such as cotton, paper. By fabric, it is meant to include cotton, paper, polymers etc. These compositions can be directly applied to a surface via wiping or alternatively the substrate containing the composition could be wet first to aid in soil removal and application of the surface adhesion modifying compositions.

Furthermore, it is preferred that the composition, when applied to the surface be able to provide non-stick/filming effects for at least three resoiling cycles. By "resoiling cycles" it is meant soil is deposited, then wiped clean. This is one "resoiling cycle". Greasy feel The measurement of the greasy feel can be done by qualitative assessment by trained judges. Methods for similar tactile assessments are given in ASTM method E1490-92 which gives a methodology for descriptive skin feel analysis of creams and lotions. In this standard appropriate terms for greasy, oily, and waxy are given.

Evaluations of the tactile properties of the treated surface is done as follows. First substrates are prepared. In this case glass and stainless steel slides are used. The following surface treatments can be prepared:

1. Vegetable oil (greasy/oily control)
2. Release aid systems (variation 1) being evaluated.
3. Release aid systems (variation 2) being evaluated.
4. Release aid systems (variation 3) being evaluated.
5. Release aid systems (variation 4) being evaluated.
6. No treatment (non greasy or non oily control).

Six slides of each treatment are prepared for each grader. From 5–10 graders are used.

Graders are asked to evaluate each slide for greasy or oily feel and then grade the slides on the following scale 0=very greasy / oily (treatment 1)

1=greasy or oily feel

2=There is a slight greasy or oily feel.

3=May be a slight greasy or oil feel

4=No greasy or oily feel (treatment 6)

Alternatively, one may assess the greasy feel through friction measurements of untreated and treated substrates. Some suitable methods for ioing this are described in ASTM D4518-91 and G 115-93 and the related articles cited therein.

EXAMPLES

Substrate preparation.

1. Standard glass slides or slides made from standard stainless steel are used for this test.
2. The slides are weighed.
3. The substrates are pretreated as follows. Test solutions (for example, a dispersion of a commercial lecithin sample in water with the film forming polymer) are prepared and placed on the slides and are allowed to dry.
4. The slides are weighed again.
5. After drying, the samples are soiled for testing.
6. The slides are weighed again.
7. Control slides are not pretreated.

Egg soil samples for this test are prepared as detailed below

1. The yolks are separated from the whites for 3 dozen A or AA Large eggs.
2. The chalzia is removed.
3. The yolks are rinsed in cold water.

4. The yolks are put through a strainer and allow to drain into a beaker.
5. The beaker of strained yolks is placed in a hot water bath (60C) and cook for 45 minutes.
6. After 45 minutes, the yolks are removed from hot water bath and place beaker in ice water to cool yolks to room temp. (23C).
7. The coupons are soiled by pipetting cooled egg mixture onto coupons in a Z shape.
8. The coupons are baked for 1.5 hours at 100C, turning trays and switching racks from top to bottom half way through baking time.

The Velveeta Cheese Soil for this test are prepared as follows

1. Kraft Velveeta slices (20slice per pack—Prepared Cheese Product, 9% total fat content) are used.
2. The cheese is cut into 1¼inch circles (1.5 to 2.0 gm each).
3. The cheese circle is placed on a coupon.
4. The coupons with cheese are baked for 30 minutes at 120C. The trays are rotated and racks are switched from top to bottom and cooked for 25 more minutes. Total of 55 minutes at 120C.

The Eagle Brand Condensed Milk Soil for this test may be prepared as follows:

1. The 14 oz can of Borden Eagle Brand Sweetened Condensed Milk is used.
2. The coupons are soiled by pipetting condensed milk onto coupons in a Z shape. (3 to 4 grams).
3. The soiled are baked coupons for 30 minutes at 120C. The trays are rotated and the bottom and top racks are switched. The slides are cooked for an additional 30 minutes at 120C.

Evaluation of Release Properties

The soiled slides are evaluated for release properties in the following manner.

1. The slides are placed in an Automatic Dish Washing machine (e.g., a General Electric 500 in the United States) and are washed with a standard commercially available (e.g., Cascade, Sunlight, Electrosol) detergent for Automatic Dish Washing machines.
2. After washing, the slides are weighed to determine the mass the original soil remaining.
3. In cases where the release properties are very good there is essentially no adhesion and the soil may fall off prior to washing giving essentially 100% removal of the soil.

Results from Evaluation of Releasc Properties

Slide Preparation

| | 1 | 2 | 3 | 4 | 5 | 6 |
|---|---|---|---|---|---|---|
| HPMC level | — | | 10% | — | — | — |
| HPC level | — | — | — | 2% | — | — |
| Centromix E level | — | — | — | 2% | 2% | 2% |
| Crisco Spray On | — | as is | — | — | — | — |
| grams/slide (target) | | .03 | 0.1 | 0.1 | 0.1 | 0.1 |
| diluent | | | water | EtOH | EtOH | water |

Evaluation of release properties by percent removal (by mass) of original soil.

| | 1 | 2 | 3 | 4 | 5 | 6 |
|---|---|---|---|---|---|---|
| Egg on Stainless | 18 | 98 | 16 | 99 | 98 | 97 |
| Egg on Glass | 20 | 81 | 35 | 68 | 89 | 83 |
| Cheese on Stainless | 16 | 24 | 78 | 45 | 40 | 50 |
| Cheese on Glass | 30 | 100 | 40 | 100 | 100 | 100 |
| Condensed Milk on Stainless | 77 | 96 | 67 | 73 | 79 | 93 |
| Condensed Milk on Glass | 73 | 97 | 77 | 79 | 84 | 87 |

Notes:
1. Centromix E can be obtained from the Central Soya Company.
2. HPC (hydroxypropylcellulose; Klucel HPC type LFF) can be obtained from Hercules.
3. HPMC (hydroxypropylmethylcellulose; Methocel E3 Prem LV) can be obtained from Dow Chemical.
4. Soiled slides are washed in a GE 500 automatic dishwashing machine at the following conditions
A. Water temperature 120 F.
B. Water hardness: 18 grains per gallon.
C. A standard automatic dishwashing detergent powder such as Cascade, Sunlight.

| | % | % |
|---|---|---|
| Pump spray | A | B |
| Centromix E | 2.00 | 0.01 to 50 |
| HPC, hydroxypropylcellulose | 2.00 | 0.01 to 50 |
| Deionized water | balance | 0 to 99.9 |
| Ethanol | 1 | 0 to 99.9 |
| Methylparaben. (Methyl p-hydroxybenzoate) | 0.10 | 0.01 to 0.2 |
| BHT. butylated hydroxytoluene | 50 ppm | 10 to 1000 ppm |
| Disodium EDTA. disodium ethylenediaminetetraacetate | 1000 ppm | 0 to 5000 ppm |
| sodium citrate | 1000 ppm | 0 to 5000 ppm |
| emulsifying or stabilixation agents | 0.50 | 0 to 5.00 |
| Aerosol spray | C | D |
| Centromix E | 2.00 | 0.01 to 50 |
| HPC, hydroxypropylcellulose | 2.00 | 0.01 to 50 |
| Nitrous oxide, N2O. | 1 | 0 to 10 |
| Nitrogen, N2 | nil | 0 to 10 |
| Deionized water | balance | 0 to 99.9 |
| Ethanol | 5.00 | 0 to 8 |
| § 184.1490 Methylparaben. methyl p-hydroxybenzoate | 0.10 | 0.01 to 0.2 |
| BHT. Butylated hydroxytoluene | 50 ppm | 10 to 1000 ppm |
| Disodium EDTA. disodium ethylenediaminetetraacetate | 1000 ppm | 0 to 5000 ppm |
| sodium citrate | 1000 ppm | 0 to 5000 ppm |
| emulsifying or stabilixation agents | 0.50 | 0 to 5.0 |
| Wipe or dispenser | E | F |
| Centromix E | 2.00 | 0.01 to 50.0 |
| HPC, hydroxypropylcellulose | 2.00 | 0.01 to 50.0 |
| Deionized water | balance | 0 to 99.9 |
| § 184.1490 Methylparaben. methyl p-hydroxybenzoate | 0.10 | 0.01 to 0.2 |
| BHT. Butylated hydroxytoluene | 50 ppm | 10 to 1000 ppm |

-continued

| | % | % |
|---|---|---|
| Disodium EDTA. Disodium ethylenediaminetetraacetate | 1000 ppm | 0 to 5000 ppm |
| sodium citrate | 1000 ppm | 0 to 5000 ppm |

What is claimed is:

1. A surface adhesion modifying composition comprising a toxicologically-acceptable film forming polymer, a toxicologically-acceptable release aid, and a toxicologically-acceptable adjunct; wherein said film forming polymer and said release aid are present in a weight ratio of from about 1:20 to about 20:1, wherein said adjunct is selected from the group consisting of ethylcellulose, hydroxypropylcellulose, methylhydroxypropylcellulose, methyl ethyl cellulose, PVP, copolymer condensates of ethylene oxide and propylene oxide, and polyethylene glycol, and mixtures thereof; wherein said composition has a non-greasy feel when applied to a surface; and wherein said toxicologically-acceptable film forming polymer, release aid, and adjunct contains an active material that is safe for use on food contact surfaces.

2. A composition according to claim 1 wherein said composition provides non-stick properties to a food-contacting surface when applied to said surface.

3. A composition according to claim 1 wherein said release aid is selected from the group consisting of phospholipids, and mixtures thereof.

4. A composition according to claim 1 wherein said composition is in a form selected from the group consisting of a liquid, gel, paste, aerosol, solid, and pumpable spray.

5. A composition according to claim 3 wherein said carrier is adsorbed on to a flexible substrate.

6. A composition according to claim 5 wherein said flexible substrate is selected from the group consisting of woven fabric, non-woven fabric, and mixtures thereof.

7. A composition according to claim 3 wherein said solvent is selected such that the composition provides a dry surface after 5 minutes.

8. A surface adhesion modifying composition comprising a toxicologically-acceptable release aid, said composition is without an oily or greasy feel or touch when applied to a surface, wherein said composition is applied to a surface as a film, said film is water resistant but said film is removable upon application of a cleaning solution.

9. A surface adhesion modifying and cleaning composition said composition comprising a toxicologically-acceptable release aid and a cleaning system; wherein said composition is without an oily or greasy feel or touch when applied to a surface; and wherein said toxicologically-acceptable release aid contains an active material that is safe for use on food contact surfaces.

10. A method for rendering a food-contact surface non-stickable comprising depositing a composition according to claim 1 onto said food-contact surface.

11. A method for preventing the adhesion of a soil to a hard surface comprising the application to the surface the composition according to claim 1.

12. A method of aiding the cleaning of a hard surface, that is subject to resoiling, comprising the step of contacting said hard surface with an effective-amount of the composition of claim 1 to provide non-stick/filming effects for at least three resoiling cycles.

* * * * *